US008665913B2

(12) United States Patent
Maekawa

(10) Patent No.: US 8,665,913 B2
(45) Date of Patent: Mar. 4, 2014

(54) COMMUNICATION DEVICE TO OBTAIN TIME INFORMATION

(75) Inventor: Yohei Maekawa, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 244 days.

(21) Appl. No.: 12/565,234

(22) Filed: Sep. 23, 2009

(65) Prior Publication Data

US 2010/0080122 A1   Apr. 1, 2010

(30) Foreign Application Priority Data

Sep. 26, 2008   (JP) ................................ 2008-248602

(51) Int. Cl.
*H04J 3/06*   (2006.01)

(52) U.S. Cl.
USPC ........... 370/512; 370/519; 709/229; 709/248; 713/401; 713/601

(58) Field of Classification Search
USPC .............. 370/230.1, 235, 236, 237, 282, 512, 370/519, 522; 709/229, 248; 713/401, 601
See application file for complete search history.

(56) References Cited

U.S. PATENT DOCUMENTS

| 7,352,715 | B2 * | 4/2008 | Salt et al. ....................... 370/328 |
| 2003/0099197 | A1 * | 5/2003 | Yokota et al. .................. 370/230 |
| 2003/0189901 | A1 * | 10/2003 | Ozugur et al. ................ 370/230 |
| 2003/0235216 | A1 * | 12/2003 | Gustin .......................... 370/509 |
| 2005/0052994 | A1 * | 3/2005 | Lee ................................ 370/230 |
| 2005/0267980 | A1 * | 12/2005 | Warren et al. ................. 709/232 |
| 2007/0002735 | A1 * | 1/2007 | Hayashi et al. ............... 370/229 |
| 2007/0147435 | A1 * | 6/2007 | Hamilton et al. ............. 370/503 |
| 2008/0239964 | A1 * | 10/2008 | Mitsutake ..................... 370/237 |

FOREIGN PATENT DOCUMENTS

| JP | 11-53274 | 2/1999 |
| JP | 2004-289439 | 10/2004 |
| JP | 2005-195507 | 7/2005 |
| JP | 2007-333429 | 12/2007 |

* cited by examiner

*Primary Examiner* — Awet Haile
(74) *Attorney, Agent, or Firm* — Scully, Scott, Murphy & Presser, P.C

(57) ABSTRACT

A communication device that is to be connected to a providing server for providing time information via a network is provided. The communication device includes a congestion-degree obtainer to obtain a congestion degree indicating a condition of traffic in the network, a time information obtainer to obtain the time information provided by the providing server, and an obtainment restrictor to compare the obtained congestion degree with a predetermined reference degree of congestion, and restricts the time information obtainer from obtaining the time information if the comparison indicates that the traffic in the network is busier than the reference degree of congestion.

5 Claims, 8 Drawing Sheets

COMMUNICATION DEVICE TO OBTAIN TIME INFORMATION

CROSS REFERENCE TO RELATED APPLICATION

This application claims priority from Japanese Patent Application No. 2008-248602, filed on Sep. 26, 2008, the entire subject matter of which is incorporated herein by reference.

BACKGROUND

1. Technical Field

An aspect of the present invention relates to a communication device, which is capable of communicating with an external device via a network to obtain time information from a time server, and a computer usable medium therefor.

2. Related Art

Conventionally, a technique to correct time running in a communication device within a network has been known. For example, a network system, in which a communication device obtained time information from an external device being a time server, is known. The time running in the communication device is corrected based on the obtained time information. In such a network system, specifically, a method to correct the time of the communication device in consideration of a time period required in transmission of the request for the time information and a time period required in transmission of the time information in reply (i.e., time periods for the round-trip communication) is used. More specifically, the time periods for the round-trip communication is divided by two, and correction is made by adding the halved period of the round-trip communication to the time indicated in the time information.

SUMMARY

However, even with the above calculation, accuracy of the time information may not be secured, depending on conditions of the network, and the time running in the communication device may not be updated correctly when the time information is inaccurate.

In view of the above drawbacks, the present invention is advantageous in that a communication device capable of communicating with an external device via a network, in which accurate time information is obtained by the communication device, is provided.

According to an aspect of the present invention, a communication device that is to be connected to a providing server for providing time information via a network is provided. The communication device includes a congestion-degree obtainer configured to obtain a congestion degree indicating a condition of traffic in the network, a time information obtainer configured to obtain the time information provided by the providing server, and an obtainment restrictor configured to compare the obtained congestion degree with a predetermined reference degree of congestion, and restricts the time information obtainer from obtaining the time information if the comparison indicates that the traffic in the network is busier than the reference degree of congestion.

According to another aspect of the present invention, a computer readable medium to store computer readable instructions is provided. The instructions manipulate a communication device to obtain time information from a providing server via a network by executing steps of obtaining a congestion degree indicating a condition of traffic in the network, obtaining the time information provided by the providing server, and comparing the obtained congestion degree with a predetermined reference degree of congestion, and restricting obtainment of the time information if the comparison indicates that the traffic in the network is busier than the reference degree of congestion.

BRIEF DESCRIPTION OF THE ACCOMPANYING DRAWINGS

DETAILED DESCRIPTION

Hereinafter, embodiments according to an aspect of the present invention will be described with reference to the accompanying drawings.

Figure 1:
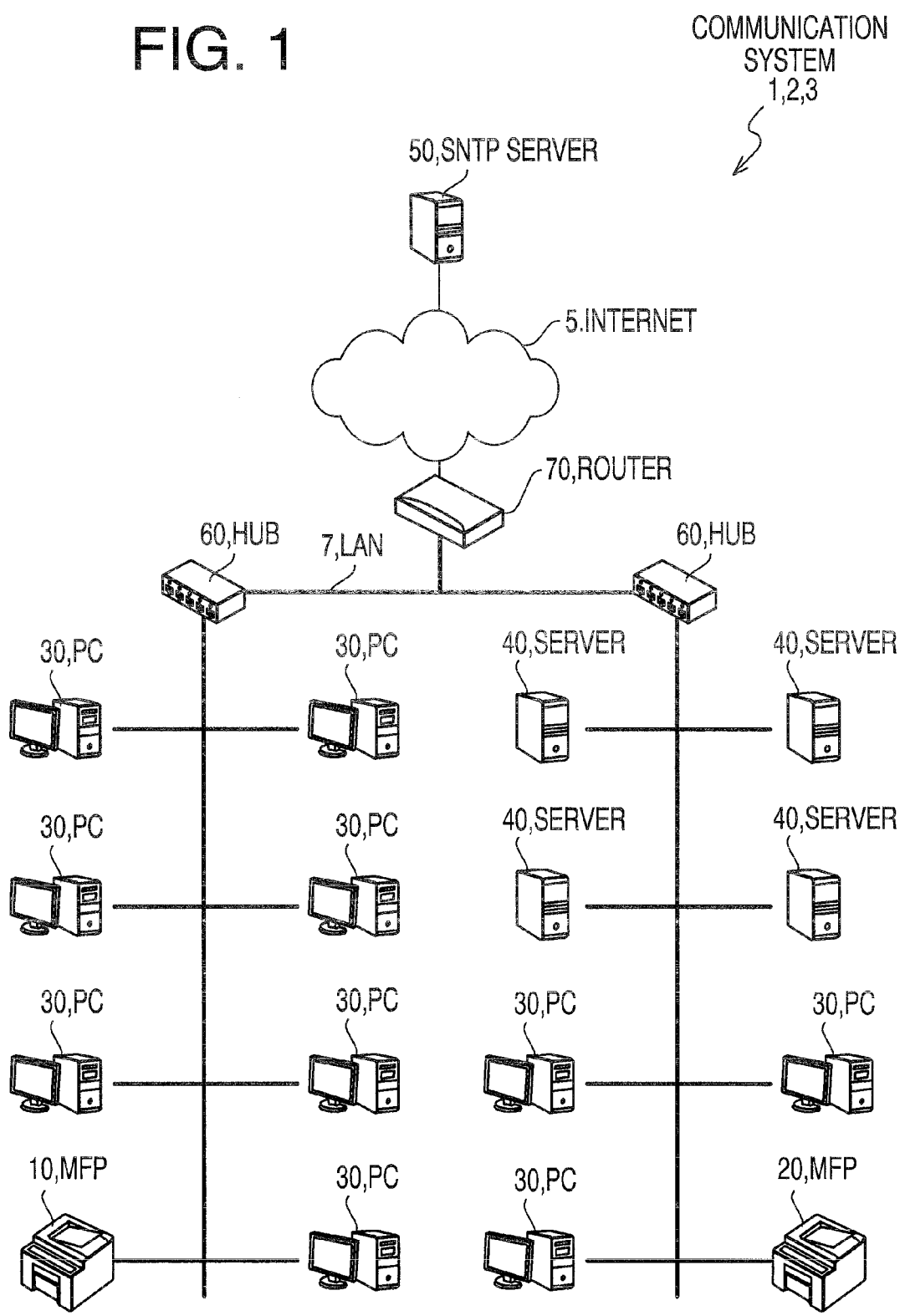
FIG. 1 is a schematic diagram to illustrate a communication system 1 according to a first embodiment of the present invention.

As shown in FIG. 1, the communication system 1 includes a plurality of MFP 10, 20, a plurality of Personal Computers (PCs) 30, a plurality of servers 40, which are connected with one another within a Local Area Network (LAN) 7. The LAN 7 is connected to a Simple Network Time Protocol (SNTP) server 50 through the Internet 5. The communication system 1 further includes a plurality of hubs 60 and a router 70, which are relaying devices to relay the communication within the communication system 1. The SNTP server 50 will be also referred to as a time server 5 in the present embodiment. The MFPs 10, 20 serve as SNTP clients, which can obtain time information indicating current time for the communication system 1 from the time server 50. A plurality of relaying devices (not shown), such as hubs, routers, and gateways, are provided in the Internet 5.

Figure 2:
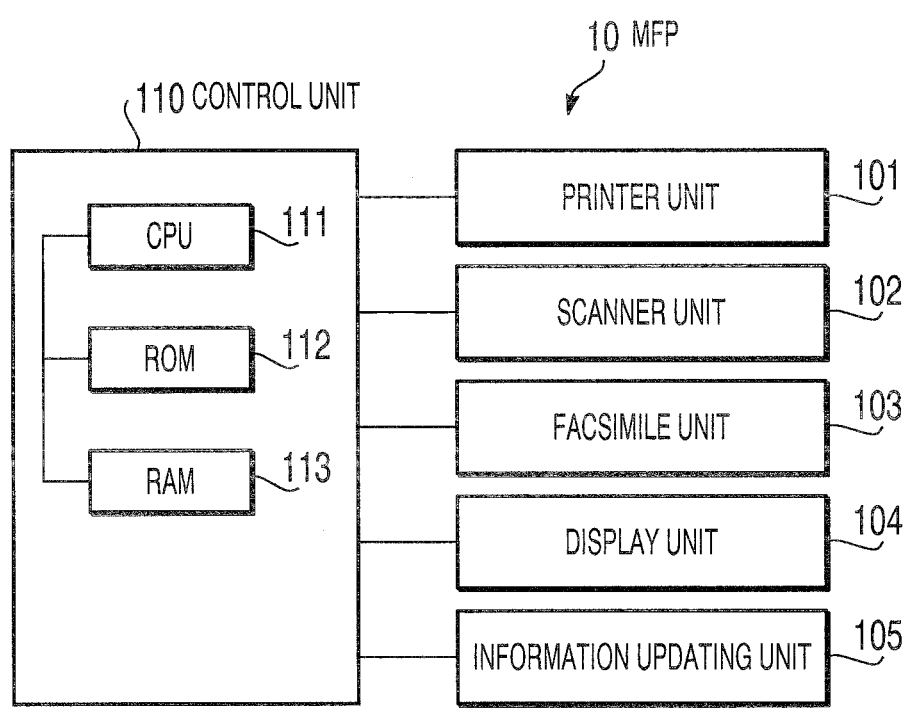
FIG. 2 is a block diagram to illustrate an overall configuration of an MFP (multi-function peripheral) 10 according to the first embodiment of the present invention.

As shown in FIG. 2, each of the MFPs 10 includes a control unit 110 to control behaviors of the MFP 10. The control unit 110 being a microcomputer includes a CPU 111, a ROM 112, and a RAM 113. It is to be noted that the MFPs 20 are in a same configuration as the MFPs 10; therefore, detailed description and illustration of the MFPs 20 is represented by those of the MFP 10.

Each process in the MFP 10 is performed under control of the control unit 110 based on programs stored in the ROM 112. In particular, the MFP 10 is provided with a printer unit 101, a scanner unit 102, a facsimile unit 103, a display unit 104, and a time information updating unit 105. Functions equipped to each of the units are utilized according to programs stored in the ROM 112 under control of the control unit 110. The time information updating unit 105 serves to obtain the time information from the one of the time servers 50 so that the clock indicating the time running in the MFP 10 is updated and the updated time is displayed in the display unit 104, and to communicate with a server (not shown) provided by a manufacturer of the MFP 10 in order to update software programs installed in the MFP 10 itself. When the MFP 10 updates the software programs installed in the MFP 10 itself, known Kerberos Authentication using the time running in the MFP 10 may be used. The MFP 10 is configured to display a plurality of digits of numerical figures, which indicate current time running in the MFP 10, in a predetermined area in the display unit 104. The time in the MFP 10 may be represented by, for example, 4 digits indicating a month and a day, 2 digits indicating an hour, 2 digits indicating minutes, 2 digits indicating seconds, and 1 digit indicating a tenth of a second.

In the present embodiment, a period in which a smallest digit among the plurality of digits indicating the time running in the MFP 10 is maintained is referred to as display continuance. For example, if the smallest digit to be displayed in the display unit 104 indicates a second, display of the second is updated at each second, and the display continuance refers to one second.

In the communication system 1 configured as above, the MFPs 10 can request the time server 50 for time information. The time server 50 receiving the requests transmits the time information to the MFPs 10, 20 in return. The MFPs 10 receiving the time information correct the time running in the MFPs 10 themselves respectively.

Figure 3:
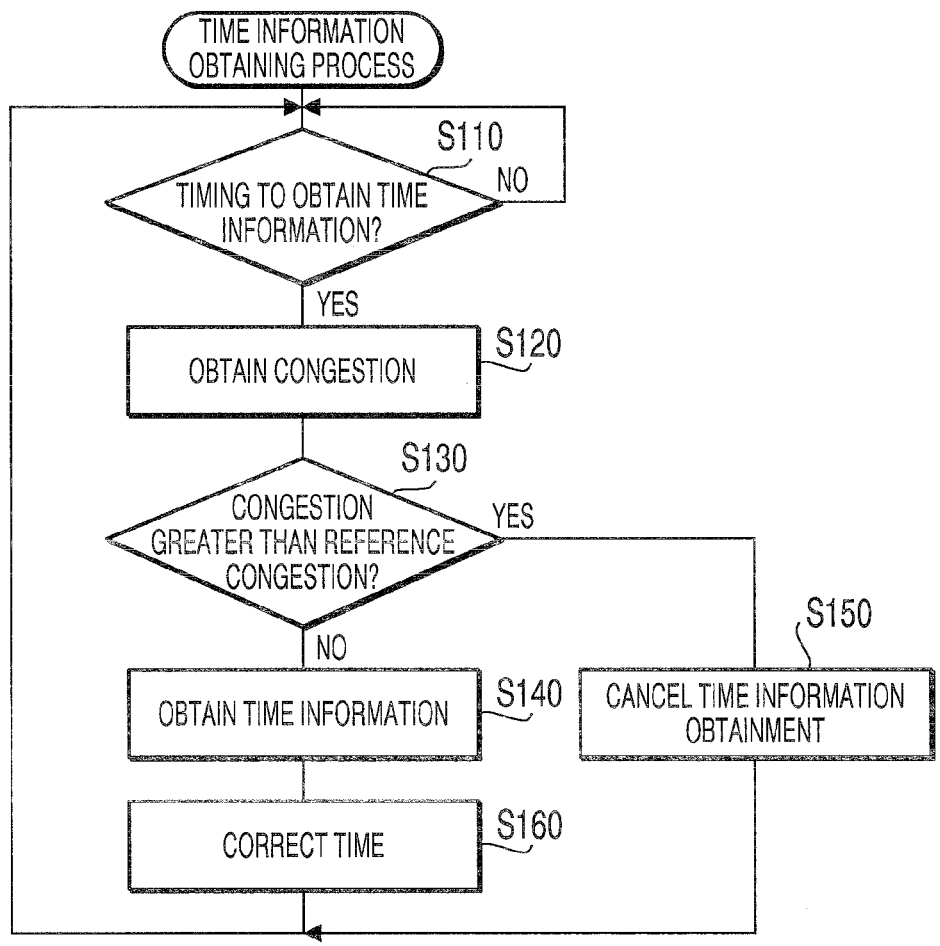
FIG. 3 is a flowchart to illustrate a time information acquiring process to be performed in the MFP 10 according to the first embodiment of the present invention.

The process in the communication system 1 will be described hereinbelow with reference to FIG. 3.

The time information acquiring process starts, for example, when an MFP 10 (20) is powered on. When the process starts, in S110, the control unit 110 examines and judges as to whether the current time is predetermined timing to obtain time information.

The timing to obtain the time information may be set, for example, periodically at an interval. The timing may be determined based on a cyclic period after a previous time information obtainment. Alternatively, for example, it may be determined that the current time is the predetermined timing once a length of an elapsed period after the previous time information obtainment exceeds a predetermined length.

In S110, if the current time does not indicate the predetermined timing to obtain the time information (S110: NO), the control unit 110 repeats S110 until the predetermined timing comes. If the current time indicates the predetermined timing (S110: YES), in S120, the control unit 110 obtains a degree of congestion of traffic in the network (i.e., at least one of the Internet 5 and the LAN 7).

In the present embodiment, the router 70 connecting the LAN 7 with the Internet 5 serves as a network analyzer, which detects a degree of congestion of traffic in the network. The degree of congestion of traffic in the network can be represented by, for example, a throughput value (i.e., a data transfer amount per unit of time) and a packet-loss rate. According to the present embodiment, the throughput value decreases and the packet-loss rate increases as the network becomes busier.

Therefore, in S120, the control unit 110 obtains the throughput value of the network from the router 70. Thereafter, in S130, the control unit 110 compares the obtained throughput value with a predetermined threshold, which indicates reference congestion degree of the network. When the obtained throughput value is greater than the predetermined threshold, i.e., the degree of congestion of the network indicates that the network is not as busy as the reference congestion degree (S130: NO), in S140, the control unit 110 requests the time server 50 for time information to obtain the time information, which is transmitted from the time server 50 in return. In this regard, the time server 50 provides the time information which indicates the current time on a scale of the tenth of a second. When the time information is obtained, the flow proceeds to S160.

The threshold of the throughput value can be determined experimentally or empirically. For example, the threshold may be 30% of an average throughput value of a day. When the congestion degree of the network is determined based on a packet-loss rate, the packet-loss rate may be determined similarly as above.

In S130, when the obtained throughput value is smaller than or equal to the predetermined threshold, i.e., the congestion degree of the network indicates that the network is busier than the reference congestion degree (S130: YES), in S150, the control unit 110 cancels obtainment of the time information and returns to S110 to repeat the time information acquiring process.

In S160, the control unit 110 corrects the time running in the MFP 10 based on the obtained time information.

Figure 4:
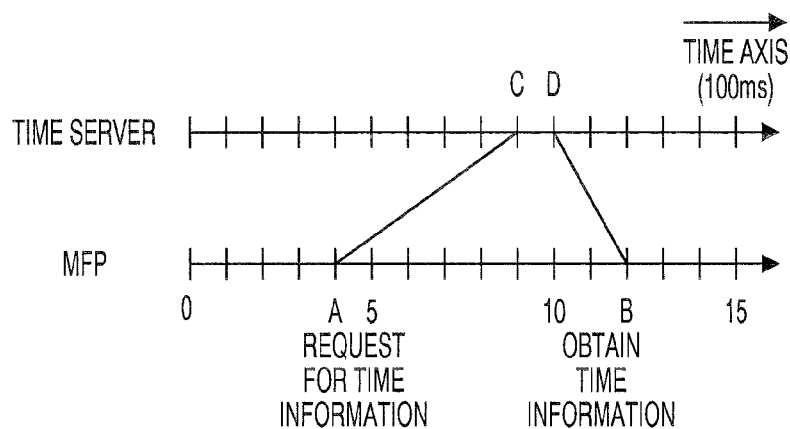
FIG. 4 illustrates time-lines of a time server 50 providing the time information and the MFP 10 receiving the time information according to the first embodiment of the present invention.

As shown in FIG. 4, timing in which the MFP 10 requests the time server 50 for the time information is indicated by a point A, and timing in which the MFP 10 obtains the time information is indicated by a point B. Further, timing in which the time server 50 receives the request from the MFP 10 is indicated by a point C, and timing in which the time server 50 transmits the time information in return is indicated by a point D. When the time information is obtained in the above time lines, the time T to set in the MFP 10 is obtained in the following equation;

$$T=D+\{(B-A)-(D-C)\}/2.$$

In this regard, the information provided by the time server 50 generally includes information of the timing C, in which the time server received the request for the time information as well as information of the timing D, in which the time server transmits the time information (i.e., the current time for the time server 50). Therefore, the MFP 10 can obtain the time T according to the above equation. If, for example, the information provided by the time server 50 does not include the information of the timing C, the MFP 10 can assume the processing time in the time server 50 (i.e., D minus C) to be generally expected processing duration (e.g., 100 millisecond) to calculate the time T in accordance with the above equation.

The control unit 110 of the MFP 10 updates the time in the MFP 10 with the time T calculated as above in S160, and the corrected time T is displayed in the display unit 104. The flow of the time information acquiring process returns to S110.

According to the above configuration, the MFP 10 in the communication system 1 obtains the degree of congestion of the network traffic, which includes a communication path between the MFP 10 and the time server 50, and obtains the time information from the time server 50. In this regard, however, when the congestion degree indicates that the traffic in the network is greater than the reference congestion degree, that is, the network is busier, the control unit 110 prevents the MFP 10 from obtaining the time information.

Thus, obtainment of the time information is prevented depending on the congestion degree of the network traffic. This is because, for example, relaying devices may require longer time to relay the data, and packets may be lost during the transmission, and data transmission in a busy network tends to take longer time. When delivery of the data is delayed, accuracy of the obtained time information is deteriorated.

According to the MFP 10 configured as above, however, less accurate time information is prevented from being obtained in the MFP 10, and time information which is accurate enough with respect to the reference congestion degree is obtained. Thus, updating the time in the MFP 10 with the less accurate time T can be prevented.

Further, according to the MFP 10 configured as above, delivery of the time information is avoided when the traffic in the network is busy; therefore, worsening the network condition by increasing data traffic can be prevented.

According to the MFP 10 configured as above, the congestion degree of the network traffic is obtained prior to issuing a request for the time information; therefore, the constantly changing network condition is referred to immediately before issuing the request so that the judgment as to whether the time information should be obtained is made effectively. In other words, the time information is obtained whilst the condition of the network traffic indicated by the congestion degree remains unchanged.

According to the MFP 10 configured as above, the congestion degree of the network traffic is obtained from the router 70, which is provided outside the MFP 10 externally. Therefore, the MFP 10 is released from the workload to measure and detect the congestion degree of the network traffic.

Next, a communication system 2 according to a second embodiment of the present invention will be described. In the following embodiments, components and structures similar to those in the communication system 1 in the first embodiment will be referred to by identical reference signs, and description of those will be omitted. Instead, only components and structures different from those in the communication system 1 will be described.

In the communication system 2, cancellation of the time information obtainment can be repeated within a predetermined allowance period. When the time information obtainment is repeatedly cancelled, and when the predetermined allowance period elapses, the control unit 110 requests to forcibly obtain the time information regardless of the congestion degree of the network traffic. The allowance period may be determined arbitrarily in consideration of, for example, accuracy of the clock in the MFP 10, accuracy of the time information provided by the time server 50, and timing-dependency of applications used by the MFP 10.

For example, when the clock indicating the time running in the MFP 10 gains 10 seconds in a day, and when an application used by the MFP 10, such as Kerberos, permits an error within 180 seconds, the error exceeds the allowable 180 seconds in the 18th day. Therefore, the MFP 10 is required to correct the time running in the MFP 10 before a next periodic attempts to access the time server falls on or later than the 18th day.

Figure 5A:
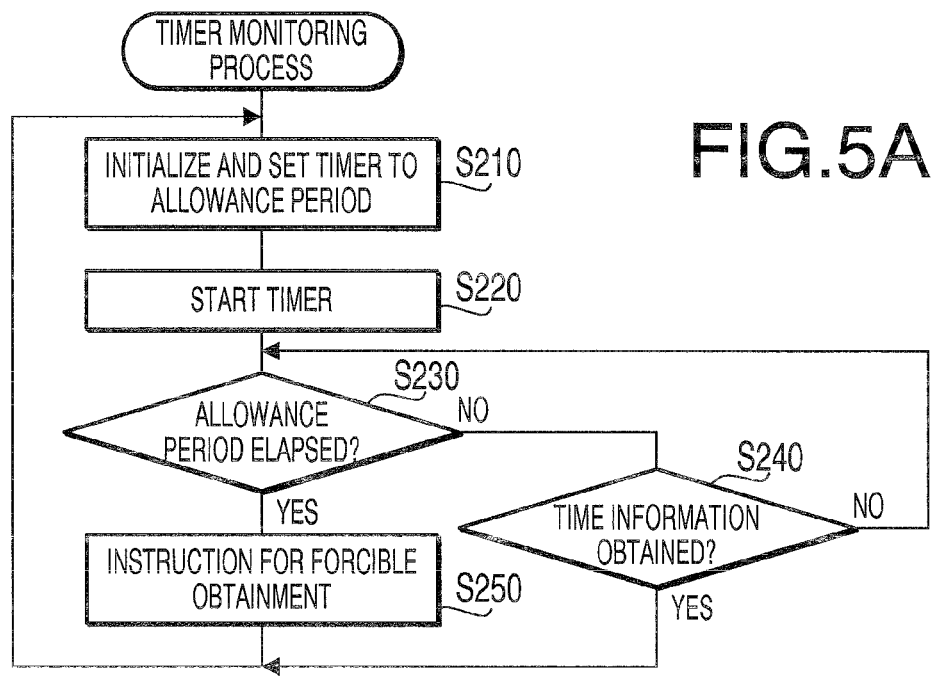
FIG. 5A is a flowchart to illustrate a timer monitoring process to be performed in the MFP 10 according to a second embodiment of the present invention.

A timer monitoring process to be performed in the MFP 10 according to the second embodiment of the present invention will be described with reference to FIG. 5A. The timer monitoring process shown in FIG. 5A starts, for example, concurrently in parallel with the time information acquiring process when the MFP 10 is powered on. In S210, the control unit 110 initializes and sets a timer. The timer is set to expire when the predetermined allowance period elapses. In S220, the control unit 110 initiates the timer, and in S230, examines to judge as to whether the allowance period has elapsed.

In S230, if the allowance period has not elapsed (S230: NO), in S240, the control unit 110 refers to a storage (e.g., the RAM 113) and judges as to whether the time information has been obtained in the time information acquiring process, which will be described later. If no time information has been obtained (S240: NO), the control unit 110 returns to S230. If the time information has been obtained (S240: YES), the control unit 110 removes the information indicating the obtainment of the time information from the storage and returns to S210.

In S240, if the time information has been obtained (S240: YES), in S250, the control unit 110 records information indicating an instruction for forcible obtainment of the time information in a storage (e.g., the RAM 113). Thereafter, the flow returns to S210.

Figure 5B:
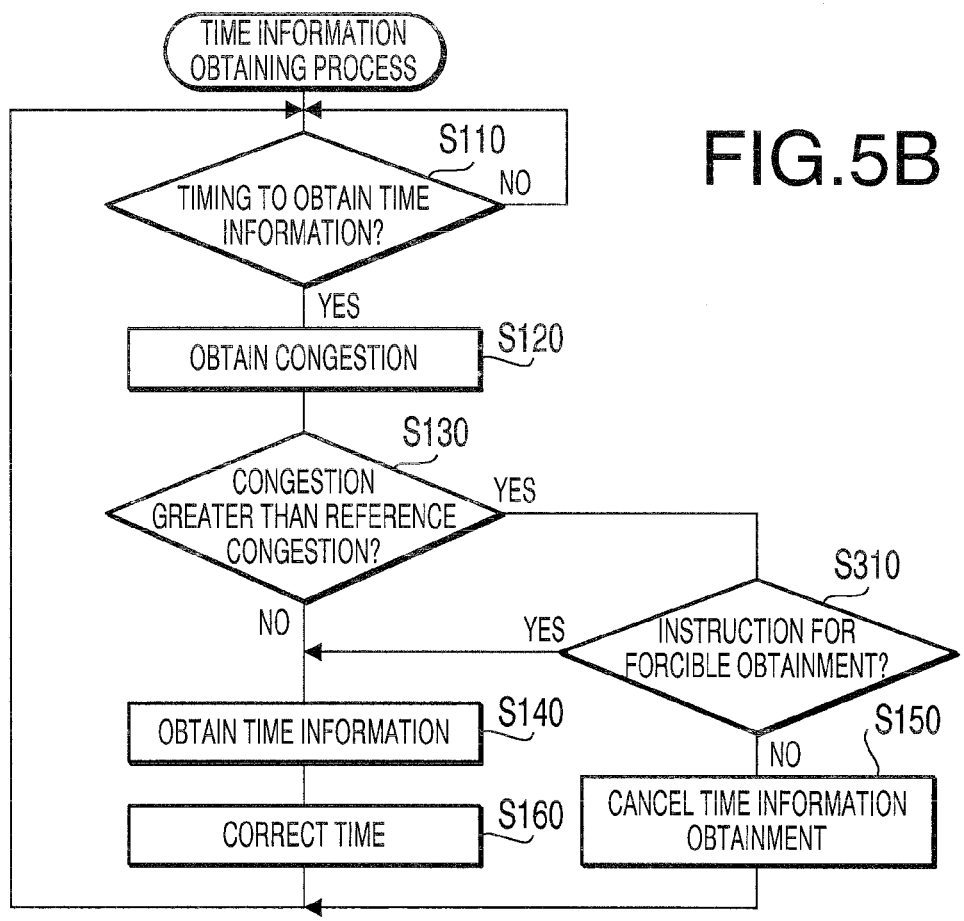
FIG. 5B is a flowchart to illustrate a timer monitoring process to be performed in the MFP 10 according to the second embodiment of the present invention.

Next, the time information acquiring process according to the second embodiment will be described with reference to FIG. 5B. The time information acquiring process according to the second embodiment is similar to the time information acquiring process according to the first embodiment except S310, which is interpolated after the positive judgment in S130 and before S140 or S150. That is, when the obtained congestion degree indicates that the network traffic is busier than the reference congestion degree (S130: YES), in S310, the control unit 110 judges as to whether the instruction for forcible obtainment of the time information is recorded in the storage.

If the instruction is recorded (S310: YES), the control unit 110 deletes the instruction from the storage, and the flow proceeds to S140 to obtain the time information from the time server 50. In this regard, the control unit 110 records information to indicate that the time information has been obtained in the storage. In S310, if no instruction for forcible obtainment is recorded in the storage (S310: NO), the process proceeds to S150, in which the obtainment of the time information is cancelled.

According to the above configuration, the MFP 10 in the communication system 2 measures a time period after previous obtainment of the time information so that the obtainment of time information is permitted after the predetermined allowance period has elapsed. Therefore, it is prevented that the MFP 10 is left on hold endlessly and not provided with the time information.

Figure 6:
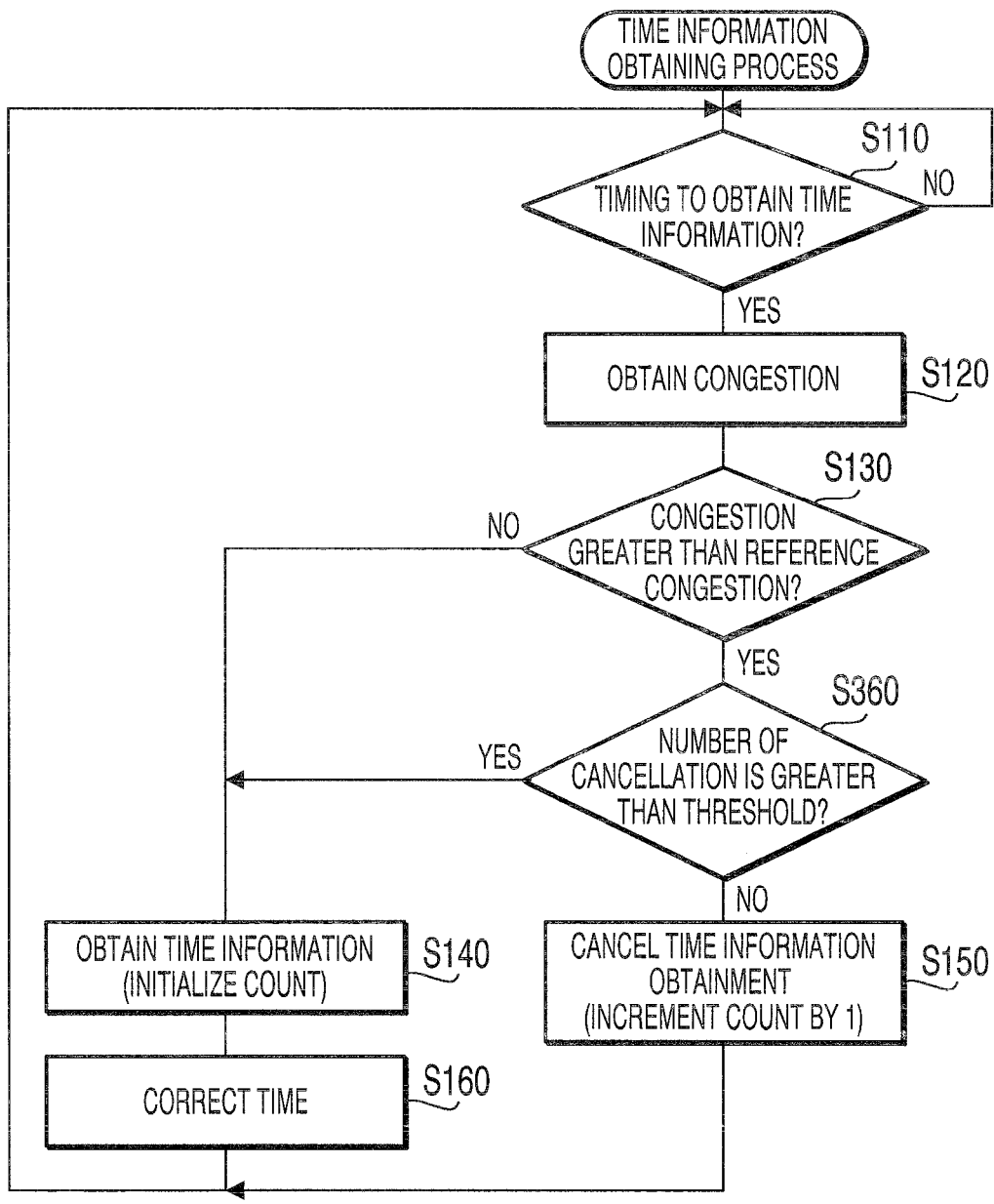
FIG. 6 is a flowchart to illustrate a time information acquiring process to be performed in the MFP 10 according to the third embodiment of the present invention.

Next, a communication system 3 according to a third embodiment of the present invention will be described with reference to FIG. 6.

The time information acquiring process according to the third embodiment is similar to the time information acquiring process in the second embodiment except S360, which is to be replaced with S310. That is, when the obtained congestion degree indicates that the network traffic is busier than the reference congestion degree (S130: YES), in S360, the control unit 110 refers to a storage (e.g., the RAM 113) to examine as to whether a number of cancellation of obtaining the time information exceeded a predetermined number. In the time information acquiring process according to the third embodiment, each time obtainment of the time information is cancelled in S150, the number of cancellation is counted and recorded in the storage. When the number of cancellation is greater than the predetermined number (S360: YES), the flow proceeds to S140. In this regard, in S140, the control unit 110 clears the number of cancellation and initialize to zero. When the number of cancellation is smaller than or equal to the predetermined number (S360: NO), the flow proceeds to S150, and the control unit 110 cancels obtainment of the time information. Further, the number of cancellation is incremented by one.

According to the above configuration, the MFP 10 in the communication system 3 counts the number of cancellation of obtaining the time information so that obtainment of the time information is permitted when the number of cancellation exceeds the predetermined number. Therefore, it is prevented that the MFP 10 is left on hold endlessly and not provided with the time information.

Although an example of carrying out the invention has been described, those skilled in the art will appreciate that there are numerous variations and permutations of the communication device and the method that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the congestion degree of the network traffic obtained from the router 70 may be replaced with a packet-loss rate. Further, the threshold to be compared with the obtained congestion degree of the network traffic may be variable. For example, the threshold may be lowered so that obtainment of the time information may be cancelled more frequently when denser and busier traffic in the network is predicted.

Figure 7:
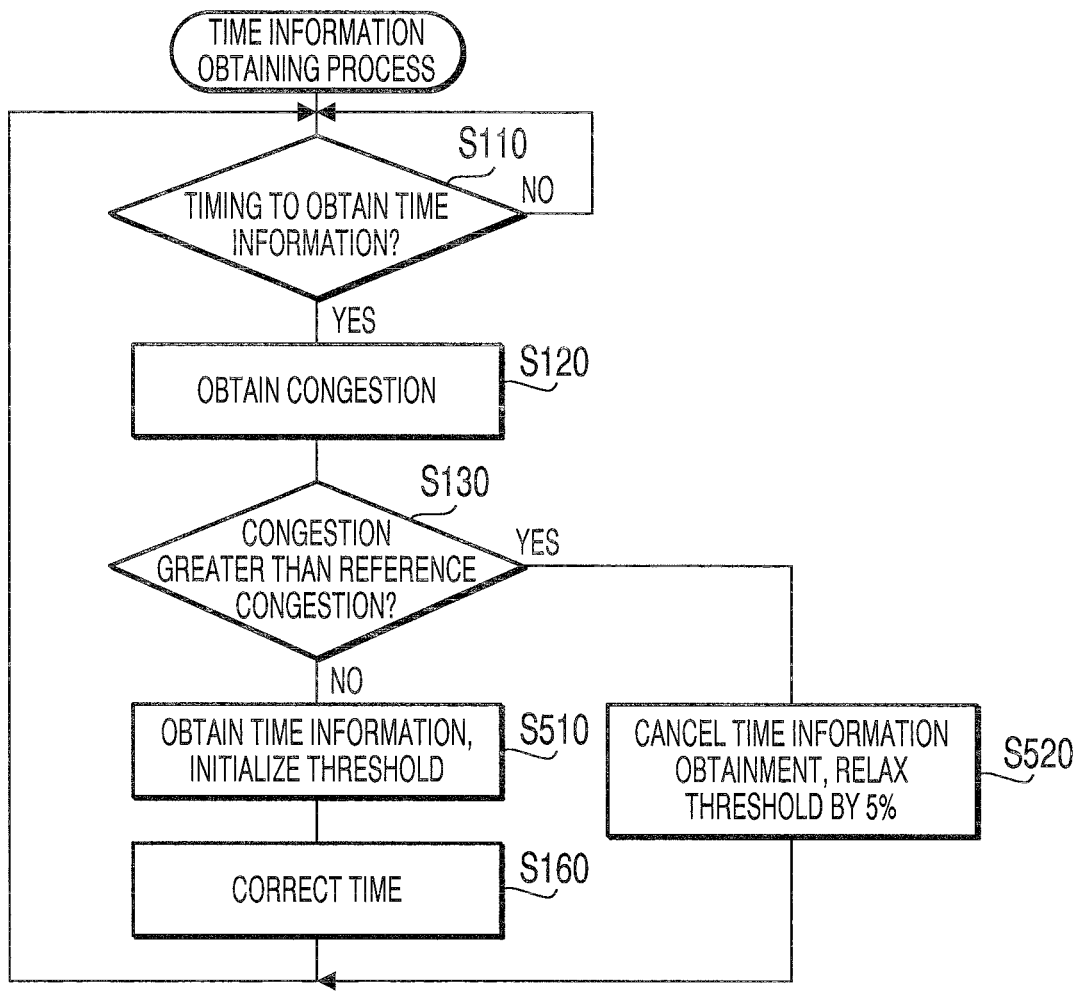
FIG. 7 is a modified embodiment of the time information acquiring process to be performed in the MFP 10 according to the embodiment of the present invention.

Furthermore, when obtainment of the time information is cancelled, and when the flow proceeds to S130 once again, the threshold may be increased so that the time information is likely to be obtained. For example, the threshold may be increased by 5 percent when once obtainment of the time information is cancelled in S150. FIG. 7 is such a modified embodiment of the time information acquiring process to be performed in the MFP 10 according to the embodiment of the present invention. As shown in FIG. 7, S150 in the time information acquiring process in the first embodiment is replaced with S520, in which the threshold is incremented by 5 percent so that restriction to obtaining the time information is relaxed and the time information is likely to be obtained in the next flow.

In the above flow, incrementing or decrementing of the threshold depends on parameters to indicate the congestion degree. That is, when the congestion degree is represented by a throughput value, a lowered threshold will be likely to allow obtainment of the time information. Therefore, the threshold can be decreased by, for example, 5 percent. Meanwhile, when the congestion degree is represented by a packet-loss rate, an increased threshold will be likely to allow obtainment of the time information. Therefore, the threshold can be increased by, for example, 5 percent.

Figure 8:
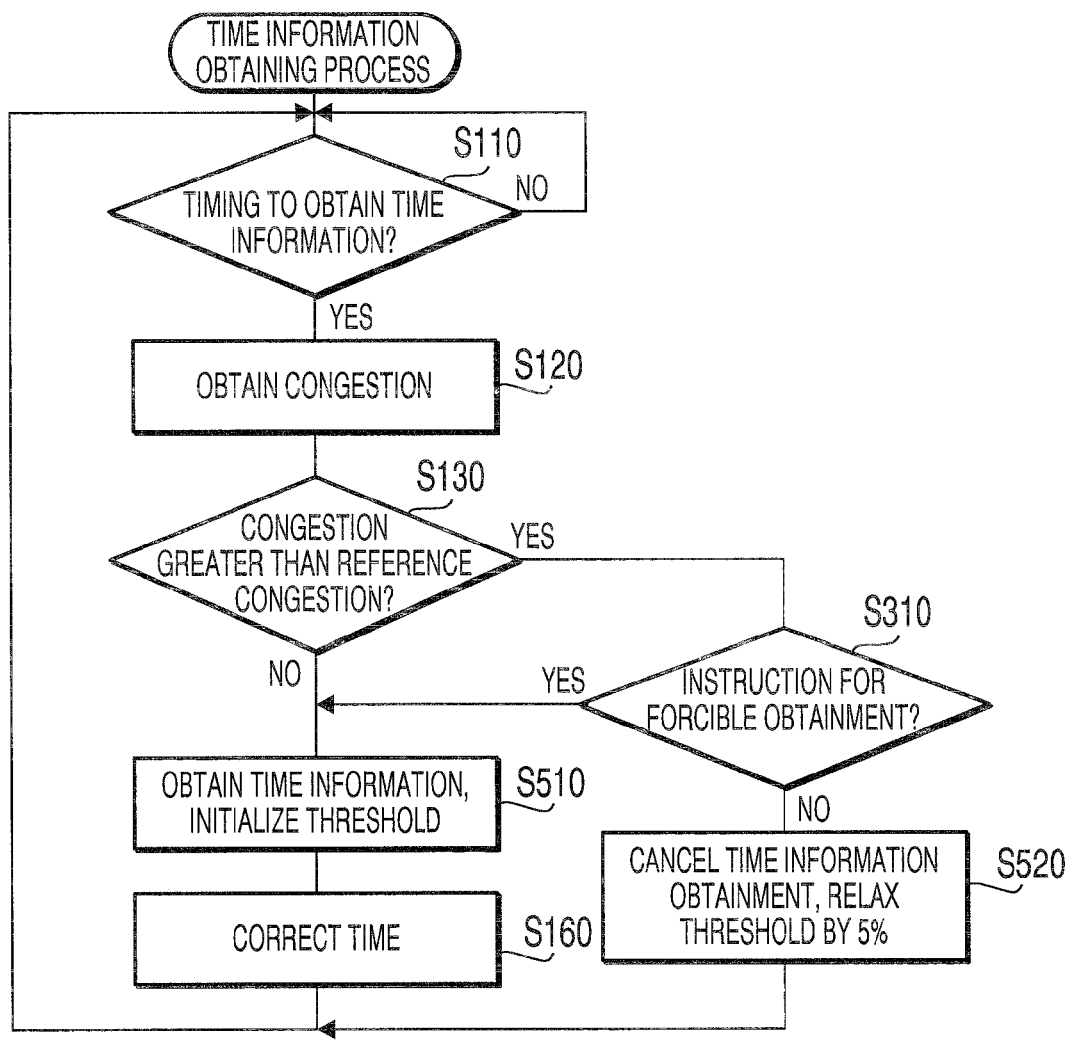
FIG. 8 is another modified embodiment of the time information acquiring process to be performed in the MFP 10 according to the embodiment of the present invention.
Figure 9:
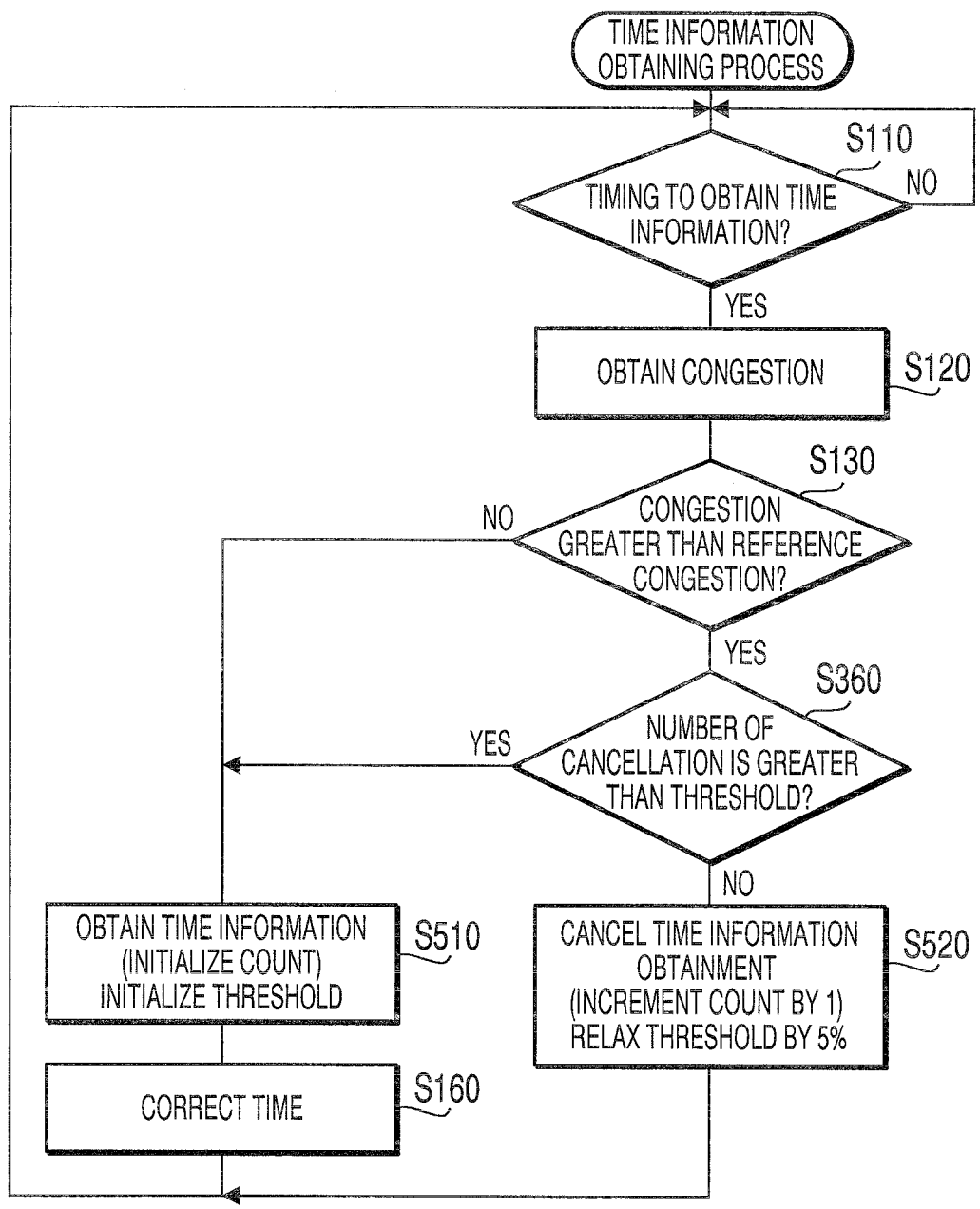
FIG. 9 is still another modified embodiment of the time information acquiring process to be performed in the MFP 10 according to the embodiment of the present invention.

When the time information is obtained as a result of the varied threshold, the threshold may be initialized to an initial value in S510. The threshold may also be varied in the flows of the time information acquiring process according to the second and the third embodiments. That is, S140 and S150 shown in FIG. 5B and FIG. 6 may be replaced with S510 and S520 respectively, as shown in FIGS. 8 and 9. FIGS. 8 and 9 are similarly modified flows of the time information acquiring process to be performed in the MFP 10 according to the embodiments of the present invention.

According to the above configurations, when the once cancelled obtainment of the time information is retried, the restriction for obtainment can be relaxed so that it is prevented the MFP 10 is left on hold endlessly and not provided with the time information.

For another example, the router 70 to analyze the congestion degree of the network traffic may be replaced with another device including the MFPs 10, 20, and the servers 40, which are connected with the network. Alternately, a dedicated device to monitor and analyze the condition of the network traffic may be provided in the network. In this regard, when the MFP 10 is provided with the function to monitor the condition of the network, the congestion degree may be obtained from the MFP 10 itself.

When the MFP 10 detect the congestion degree by itself, and when the transmission delay (according to the time points A-D, a time period indicated by (B minus A) or {(B minus A) minus (D minus C)}) may be detected and internally obtained within the MFP 10. Thus, a length of the obtained transmission delay is compared with a threshold in S130. In this regard, the threshold is determined by doubling a period of display continuance, in which display of the smallest digit (i.e., tenth of a second) indicating the smallest unit of time (i.e., 100 milliseconds) is maintained in the display unit 104. According to the above embodiments, therefore, the threshold is 200 milliseconds. When the length of the transmission delay exceeds the threshold (S130: YES), it is determined that the traffic in the network is busier than the reference congestion degree. Thereafter, in S150 or in S520, obtainment of the time information may be canceled.

According to the MFP 10 in the above configuration, an allowable time-lag in display, which can be caused between the time being displayed in the display unit 104 and the actual current time, is one-half of the length of the transmission delay at maximum. Therefore, when the length of the transmission delay is greater than the doubled display duration of the smallest digit (i.e., the time-lag in display is greater than the period of display continuance), obtainment of the time information is cancelled.

According to the MFP 10 configured as above, the time-lag in display can be maintained within the period of display continuance of the time. Therefore, even though momentarily, the time corresponding to the accurate time without time-lag can be displayed.

What is claimed is:

1. A communication device configured to be connected to a providing server for providing time information via a network, the communication device comprising:
   a central processing unit (CPU); and
   a memory coupled to the CPU, storing instructions that, when executed by the CPU cause the communication device to:
   obtain a congestion degree indicating a condition of traffic in the network from a network device which is different from the providing server;
   request the providing server for the time information; and
   obtain the time information provided by the providing server,
   before requesting the time information, compare the obtained congestion degree with a predetermined reference degree of congestion;
   when the comparison indicates that the obtained congestion degree is greater than the predetermined reference degree of congestion, do not request the providing server for the time information in order to avoid obtainment of the time information;
   when the comparison indicates that the obtained congestion degree is less than the predetermined reference degree of congestion, request the providing server for the time information to obtain the time information from the providing server and obtain the time information provided by the providing server;

repeat attempting to obtain the time information;

count a number of restrictions in which obtainment of the time information is continuously avoided after a predetermined timing to obtain the time information;

request the providing server for the time information and obtain the time information provided by the providing server even though the comparison indicates that the obtained congestion degree is greater than the predetermined reference degree of congestion, when the counted number of restrictions exceeds a predetermined number; and increase the predetermined reference degree of congestion when obtainment of the time information is avoided.

2. The communication device according to claim 1,
wherein the communication device further comprises a time measurer configured to measure a length of an elapsed period between previous obtainment of the time information and present time, requests the providing server for the time information and obtains the time information, even though the comparison indicates that the obtained congestion degree is greater than the predetermined reference degree of congestion, if the length of the elapsed period is greater than a predetermined threshold length.

3. The communication device according to claim 1,
wherein the congestion degree is obtained from the network device that is provided outside the communication device.

4. The communication device according to claim 1, further comprising:
a time corrector configured to correct the obtained time information by adding one-half of a length of transmission delay to the obtained time information, wherein the length of transmission delay is caused during data exchange between the communication device and the providing server; and a display unit configured to display a plurality of digits of numerical figures corresponding to the corrected time information, wherein length of transmission delay is obtained as the congestion degree; and wherein the length of the transmission delay is compared with a predetermined threshold period, and, when the length of the transmission delay is greater than a doubled length of the predetermined threshold period, the providing server is not requested for the time information in order to avoid obtainment of the time information, wherein the predetermined threshold period is a display continuance period of a smallest digit among the plurality of digits of numerical figures, and the smallest digit indicates a smallest unit of time to be displayed in the display unit.

5. A computer readable storage device to store computer readable instructions to manipulate a communication device to obtain time information from a providing server via a network by executing steps of:

obtaining a congestion degree indicating a condition of traffic in the network from a network device which is different from the providing server;

comparing the obtained congestion degree with a predetermined reference degree of congestion;

requesting, if the comparison indicates that the obtained congestion degree is less than the predetermined reference degree of congestion, the providing server for the time information to obtain the time information; and obtaining the time information provided by the providing server, wherein the communication device does not request the providing server for the time information in order to avoid obtainment of the time information if the comparison indicates that the obtained congestion degree is greater than the predetermined reference degree of congestion;

counting a number of restrictions in which obtainment of the time information is continuously avoided after a predetermined timing to obtain the time information, requesting the providing server for the time information and obtain the time information provided by the providing server even though the comparison indicates that the obtained congestion degree is greater than the predetermined reference degree of congestion, when the number of restrictions counted exceeds a predetermined number;

increasing the predetermined reference degree of congestion when obtainment of the time information is avoided.

* * * * *